July 10, 1934.    O. W. SWANSON    1,965,612
FOWL STICKING MACHINE
Filed March 23, 1931    2 Sheets-Sheet 1
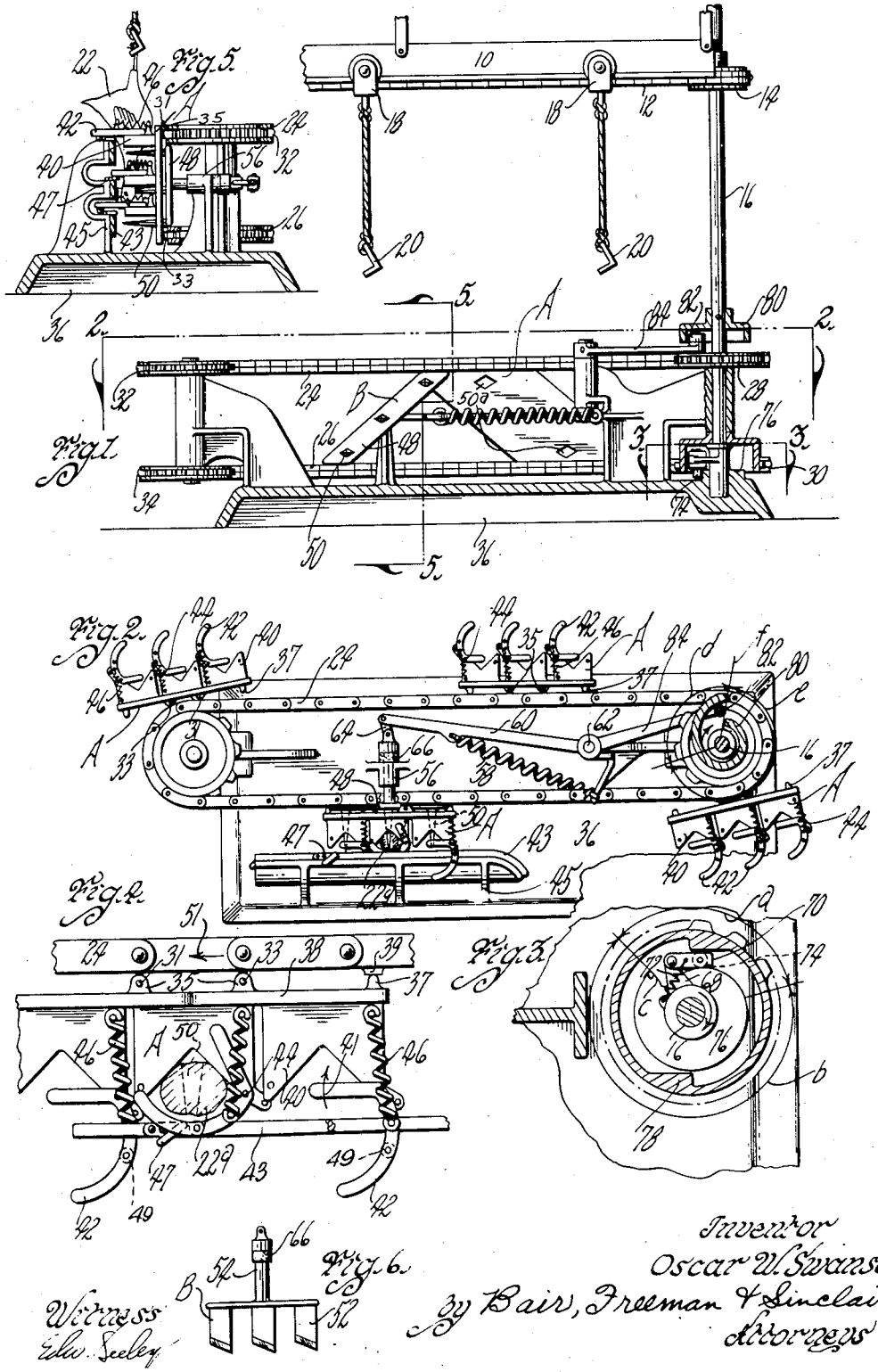

July 10, 1934.    O. W. SWANSON    1,965,612
FOWL STICKING MACHINE
Filed March 23, 1931    2 Sheets-Sheet 2
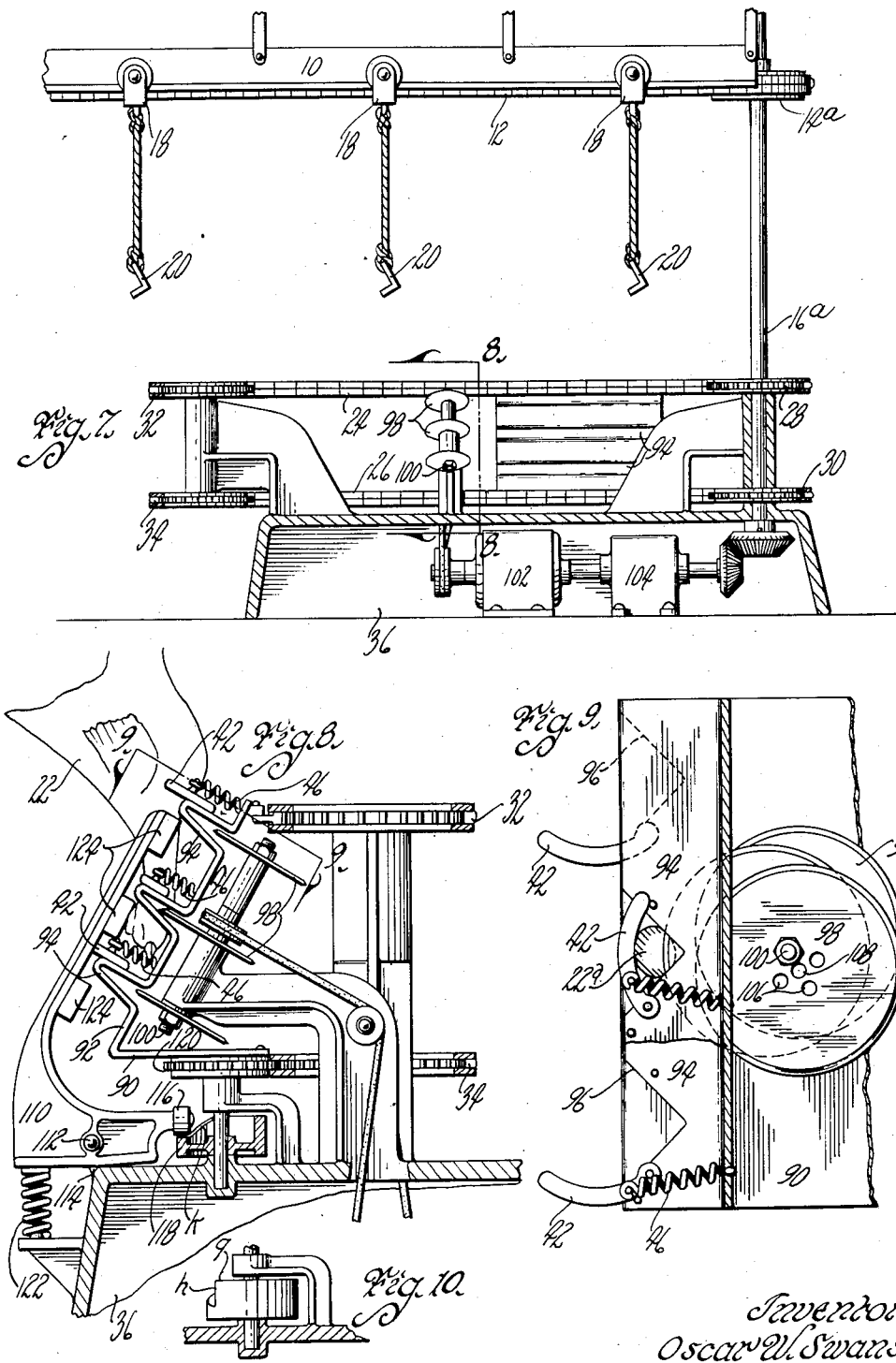
Inventor
Oscar W. Swanson
By Bair, Freeman & Sinclair
Attorneys
Witness
Edw. Seeley Patented July 10, 1934

1,965,612

UNITED STATES PATENT OFFICE 1,965,612

FOWL-STICKING MACHINE

Oscar W. Swanson, Ottumwa, Iowa

Application March 23, 1931, Serial No. 524,487

14 Claims. (Cl. 17—11)

An object of my present invention is to provide a fowl sticking machine for sticking fowls and other animals, the device being entirely automatic and simple, durable and inexpensive.

A further object is to provide a sticking machine including a conveyer for supporting and conveying animals, with holders for the animals and a sticking device for sticking the animals while held in the holders.

Another object is to provide automatic means for intermittently advancing the holders and actuating the sticking means as the animals are supported and conveyed by the conveyer.

A further object is to provide retainers on the holders which are actuated to closed position by engagement of the animals with the holders and which are opened automatically after the sticking operation has been performed.

Another object is to provide a form of sticking machine in which the operating means is actuated continuously and operates upon animals as they are held by the holders and as the holders pass the operating means.

Still a further object is to provide a brainer mechanism to operate in conjunction with the sticking means.

Still a further object is to provide cam actuated mechanism for synchronously actuating the various parts of the machine.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a central sectional view of a sticking machine embodying my invention.

Figure 2 is a horizontal sectional view on the line 2—2 of Figure 1 showing the holders and sticking mechanism in plan view.

Figure 3 is a horizontal sectional view on the line 3—3 of Figure 1 showing mechanism for advancing the holders.

Figure 4 is an enlarged plan view of the holders.

Figure 5 is a vertical sectional view on the line 5—5 of Figure 1 showing the holders and sticking device and their association with each other.

Figure 6 is a plan view of a modified form of sticking device.

Figure 7 is a side elevation of a conveyer and a substantially central section of a modified form of sticking machine in which the sticking means is actuated continuously.

Figure 8 is an enlarged sectional view on the line 8—8 of Figure 7 showing the continuously actuated sticking means and a brainer mechanism.

Figure 9 is an angular plan view partly in section of the holders and sticking means shown in Figure 8; and Figure 10 is a front elevation of a cam, the rear half of which is shown in section in Figure 8.

On the accompanying drawings I have used the reference numeral 10 to indicate a conveyer track. A conveyer chain is indicated at 12 and is supported at one end on a sprocket 14, a sprocket being provided for its other end but not shown on the drawings. The sprocket 14 is mounted on a drive shaft 16 which may be continuously operated by any suitable power means and at any suitable low speed.

Conveyer pulleys 18 travel on the track 10 and are connected with the conveyer chain 12. The pulleys 18 support shackles 20 with which the feet of animals, such as fowls 22 may be engaged for supporting the animals and conveying them. The device, for instance, may be used in connection with a scalding machine such as the one shown in the Barker & Bruce Patent, No. 1,730,964, issued October 8, 1929 and may be used in an automatic fowl handling system for poultry houses and the like including a feather picking machine such as shown in my co-pending application, Serial No. 493,062, filed November 3, 1930.

At the present time, fowls are hung on the conveyer shackles 20 and an operator called a "sticker" pierces the throat of the fowl or otherwise kills or decapitates it by hand. The primary object of my present invention is to provide an automatic power-driven device so that an operator may hang the fowls on the shackles, engage their necks with holders and then allow the machine to automatically stick or decapitate the fowls without any further attention from the operator and so that the fowls are ready for the scalding machine after passing through the present device.

My sticking machine includes holders A which are movably mounted in any suitable manner. On the drawings I have illustrated upper and lower chains 24 and 26 mounted on an idler sprocket 28 and a drive sprocket 30 at one end and on idler sprockets 32 and 34 at the other end. The sprockets are suitably journalled and supported on a base 36.

Each holder A consists of a back plate 38 and V-shaped receptors 40. The back plate 38 may be secured to the chains 24 and 26 in any suitable manner. I have shown upwardly extending hooks 31 and 33 on the chains 24 and 26 respectively with which upper and lower ears 35 of the back plate 38 coact.

Stop bosses 37 are provided to engage bosses 39 of the chains so as to retain the holder against undesired swaying movement when passing a sticking device B which I will later describe.

A retainer 42 is pivoted at 44 to each receptor 40 and an over-center spring 46 is provided for each retainer so that they are spring held in either a closed or an open position as shown in Figure 4.

The retainers 42 may be actuated to closed position by insertion of the neck 22a of the fowl 22 into the receptor 40, which swings the retainer in the direction of the arrow 41. In connection with the holder A I provide back strips 43 supported on suitable brackets 45. Each back strip 43 has a cam member 47 adapted to coact with a roller 49 of the particular retainer 42 which passes thereabove in the operation of the machine, this being best shown by the center retainer in Figure 4. The cam member 47 swings the retainer to an open position after the holder A is moved in the direction of the arrow 51 and beyond the position shown in Figure 4.

My sticking machine further includes a sticking device B consisting of a supporting bar 48 and either sticker knives 50 as shown in Figures 1 and 2 or decapitating knives 52 as shown in Figure 6. The sticking device B further includes a shank 54 slidable through a bearing 56 and actuated to sticking position by a spring 58. The spring 58 is connected with a lever 60 which has one end secured to a shaft 62 and its other end connected with the shank 54 by a link 64. A rubber bumper washer is indicated at 66.

In a sticking machine of one general character herein disclosed, it is necessary to either move the holder intermittently and actuate the sticking device when the holder is stationary or move the holder continuously and move the sticking device along with it. On the drawings I have shown a mechanism for moving the holder intermittently and actuating the sticking device while the holder is in a stationary position.

The chains 24 and 26 are moved intermittently from the continuously rotating shaft 16 in the following described manner. As shown in Figure 3, an arm 68 extends from the shaft 16. A pawl 70 is pivoted to the arm 68 and is constrained to move toward the shaft 16 by a spring 72. The arm 70 has a roller 74 rolling on a cam 76 which is stationary. The cam 76 has a rise indicated at $a$, a dwell indicated at $b$ and a drop indicated at $c$. The drive sprocket 30 is provided with two ratchet teeth 78 with which the pawl 70 may coact.

For actuating the sticking device B I provide a cam 80 secured to the shaft 16 and coacting with a roller 82 on an arm 84. The arm 84 is connected with the shaft 62. The cam 80 has a rise portion $d$ for raising the roller 82 toward the shaft 16, a dwell portion $e$ and a drop indicated by the line $f$ for dropping the roller away from the shaft.

In Figures 7, 8, 9 and 10, I have shown a modified form of sticking machine in which parts similar to the parts of the first five figures are given the same reference numerals. The holder is somewhat different, being formed of a piece of sheet metal having a base flange 90 and an angularly arranged flange 92. The flange 92 has a plurality of holder flanges 94 bent thereinto at different distances from the conveyer chain 12.

Each holder flange 94 is provided with a notch 96 similar to the notch of each holder member 40.

The holder arms 42 are spring actuated and can be automatically opened as in the first five figures of the drawings or can be manually opened if desired.

The holder flanges 94 are of V-formation when viewed endwise as shown in Figure 8, so that sticking or cutting knives 98 can extend into them and cut the throat of a fowl 22 when the holder moves past the knives. The knives 98 are circular disks sharpened at their edges and are mounted on a shaft 100. The shaft 100 may be suitably driven from a motor 102. The motor 102 can also be used for driving the shaft 16 and consequently the conveyer chain 12 and the holder chains 24 and 26 at the same speed. Suitable reduction gearing 104 may be provided for moving the conveyer chain 12 and the chains 24 and 26 at a slow rate of speed.

The knives 98 may be mounted concentric, or they may be mounted eccentric as illustrated, so that only a portion of their periphery will be dulled over a given period of time. It will be noted that openings 106 are provided off-center for the shaft 100. A central opening 108 is provided for mounting the disk when sharpening it. After one portion of the edge is dulled, then the knive can be shifted so that another opening 106 coacts with the shaft 100, thus making less frequent the necessity for sharpening the knives.

In connection with any of the types of sticking machines I have shown, a brainer mechanism can also be used. In Figures 8 and 10, I have shown an arm 110 pivoted at 112 to a bracket 114. By means of a roller 116 and a cam 118, the arm 110 may be operated for braining the fowls.

The cam 118, it will be noted, has a dwell $g$, a drop $h$ and a rise $k$. It may be driven by a sprocket 120 meshing with the chain 26, so that each time a holder has passed a certain point the roller 116 drops down the drop $h$ and the spring 122 causes a quick movement of the brainer elements 124 to engage the heads of the fowls, as illustrated in Figure 8.

*Practical operation*

In the operation of my device shown in Figures 1, 2, 3, 4, 5 and 6, the fowl 22 is hung on the shackle 20 and its neck 22a inserted in whichever receptor 40 is of the right height for the length of the fowl as it is supported from the conveyer. The retainer 42 will be automatically actuated to retain the neck 22a in the holder 40.

As the shaft 16 rotates, the roller 74 of the pawl 70 will roll on the dwell $b$ of the cam 76 until it engages one of the ratchet teeth 78 whereupon the drive sprocket 30 will be rotated a half revolution. At the completion of the half revolution the roller 74 drops down the drop $c$ of the cam because of the spring 72 thus disengaging the pawl from the ratchet tooth with which it is engaged and allowing the drive sprocket 30 and the holders A to remain stationary for another half revolution of the shaft 16. The sprocket 30 is twice the size of the sprocket 14 so that the total movement of a holder is the same as the total movement of a shackle 20, but the shackle moves continuously while the holder moves at twice the speed of the shackle and only half the time.

When the holder is in stationary position, as indicated in Figure 2, the roller 82 of the arm 84 drops as indicated by the line $f$ from the dwell e of the cam 80 to a position adjacent the rise d. The spring 58 causes a quick movement of the knife 50 or 52, as the case may be, for either sticking the throat of the fowl 22 or decapitating the fowl. The back strips 43 oppose the thrust of the sticking device as it is actuated. The rise d then causes the sticking device B to be returned to a normal inoperative position in which position it remains as long as the roller 82 engages the dwell e. After this operation is completed, the holder again advances forwardly and the roller 49 of any retainer which is in retaining position will engage its respective cam member 47 for opening the retainer. The stuck or decapitated fowl is then carried on by the conveyer chain 12 to the scalding machine.

The operation of the device shown in Figures 7, 8, 9 and 10 is somewhat simpler inasmuch as the holders and the conveyer 12 can be permitted to travel continuously at the same speed by a sprocket 14a secured to the same shaft 16a, and of the same size, as the sprocket 28 and the knives 98 need not be intermittently operated, but can be continuously operated. The angular arrangement of the flange 92 of the holder allows for a fowl in one notch to clear the next upper flange. The notches are shown off-set in Figure 9, but can be arranged in alignment.

Although I have illustrated my sticking machine for sticking fowls, it can be used for sticking other animals and for performing various operations, such as decapitating or merely cutting the throat of an animal providing the animal can be held in a holder and the sticking device can then accurately stick or otherwise operate on the animal in the desired manner.

Any kind of a sticking or operating instrument can be used and other changes may be made without departing from the real spirit and purpose of my invention, and it is my intention to cover by my claims, any modified forms of structure or use of mechanical equivalents, such as cutting knives rather than sticking knives which may be reasonably included within their scope.

I claim as my invention:

1. In a device of the class described, a conveyer for supporting and conveying animals in head-down suspended position, a holder for holding the head of an animal, means for moving said holder in synchronism with the movement of said conveyer, a sticking device for sticking an animal adjacent said holder while the animal's head is held by said holder and means for actuating said sticking device in synchronism with the movement of said holder, said last two means comprising mechanism operatively connected with said conveyer.

2. In a fowl sticking machine, a conveyor, means thereon for engaging the feet of fowls and thereby supporting and conveying them, holders for the heads of the fowls, a sticking device adjacent the line of travel of said holders and common means for continuously moving said conveyor, intermittently moving and stopping said holders and extending said sticking device to pierce the throat of a fowl in one of said holders when said holder is in stopped position adjacent said sticking device.

3. In a fowl sticking machine, a conveyor for supporting and conveying fowls, holders for the heads of the fowls, a sticking device adjacent the path of travel of said holders and means for moving said conveyor and said holders and for actuating said sticking device periodically in synchronism with the movement of said holders past said sticking device, each holder including a retainer which may be actuated to closed position by manually engaging the head of a fowl with the holder.

4. In a fowl sticking machine, a conveyor for supporting and conveying fowls, holders for the heads of the fowls, a sticking device adjacent the path of travel of said holders, means for moving said conveyor and said holders and for actuating said sticking device periodically in synchronism with the movement of said holders past said sticking device, each holder including a retainer which may be actuated to closed position by manually engaging the head of a fowl with the holder and means actuated by the movement of said conveyor for opening said retainers after said sticking device has been actuated.

5. In a fowl sticking machine, a conveyor for supporting and conveying fowls in headdown suspended position, holders for the heads of the fowls, a sticking device adjacent the path of travel of said holders, cam actuated means for said holders and said sticking device and common means for controlling the movement of said conveyor and operating said cam actuated means to thereby intermittently actuate the holders and the sticking device in synchronism with each other.

6. In a device of the class described, a conveyor for supporting and conveying animals in headdown suspended position, holders for holding the heads of the animals, common means for moving said holders and said conveyor, a sticking device for sticking animals while their heads are held by said holders, said sticking device being located adjacent the path of travel of the holders and means operated by said common means for actuating said sticking device in synchronism with the movement of said holders relative to said sticking device.

7. In a device of the class described, a movable conveyor for animals in headdown suspended position, movable holders therebelow for holding the heads of the animals and a sticking device adjacent the path of travel of the holders, said conveyor, holders and sticking device being operatively connected together for synchronous movement of the conveyor and holders and for operation of the sticking device as each of the holders assumes a position thereadjacent.

8. In a device of the class described, a movable conveyor for animals in headdown suspended position, movable holders therebelow for holding the heads of the animals and a sticking device adjacent the path of travel of the holders, said conveyor, holders and sticking device being operatively connected together for synchronous movement, the conveyor continuously and the holders intermittently, and for operating the sticking device as each of the holders assumes a position thereadjacent.

9. In a device of the class described, a conveyor for supporting and conveying animals in headdown suspended position, holders for holding the heads of the animals when so suspended, common means for moving said holders and said conveyor, a sticking device for the animals and located adjacent the path of travel of the holders for sticking the animals and means for actuating said sticking device.

10. In a device of the class described, a movable conveyor, movable holders, a sticking device, common means for operating said conveyor and said holders synchronously and means for actuating said sticking device continuously.

11. In a device of the class described, a movable conveyor, movable holders spaced therefrom and having a plurality of receptors at different distances from said conveyor, a sticking device having a sticking member for each receptor and common means for operating said conveyor and said holders.

12. In a device of the class described, the combination with a movable conveyor for suspending animals, a movable holder for a portion of the suspended animal and a sticking device for the animals, of common means for continuously moving said conveyor and for intermittently moving said holder at twice the speed of said conveyor, half the time the conveyor is moving and stopping it the other half and means for actuating said sticking device when said holder is in stopped position.

13. In a device of the class described, the combination with a movable conveyor for suspending animals, a movable holder for a portion of the suspended animal and a sticking device for the animals, of common means for continuously moving said conveyor and for intermittently moving said holder at twice the speed of said conveyor, half the time the conveyor is moving and stopping it the other half and means for actuating said sticking device when said holder is in stopped position, said holder and said sticking device being cam actuated.

14. In a device of the class described, the combination with a movable conveyor for suspending animals, a movable holder for a portion of the suspended animal, said holder having a plurality of receptors at different distances from said conveyor and a sticking device having a sticking member for each receptor, of common means for operating said conveyor and said holder together and said sticking device when the holder is in a predetermined position relative thereto.

OSCAR W. SWANSON.